United States Patent [19]

Ensor

[11] Patent Number: 5,341,452
[45] Date of Patent: Aug. 23, 1994

[54] ELECTRONIC CONTROLS FOR ELECTRIC MOTORS, LAUNDRY MACHINES INCLUDING SUCH CONTROLS AND MOTORS AND/OR METHODS OF OPERATING SAID CONTROLS

[75] Inventor: David J. Ensor, Auckland, New Zealand

[73] Assignee: Fisher & Paykel Limited, Auckland, New Zealand

[21] Appl. No.: 810,385

[22] Filed: Dec. 19, 1991

[30] Foreign Application Priority Data

Dec. 19, 1990 [NZ] New Zealand .................. 236543

[51] Int. Cl.$^5$ .............................................. H02P 5/17
[52] U.S. Cl. ........................... 388/811; 318/138; 318/254; 318/439; 318/281
[58] Field of Search ................ 318/254, 138, 439; 388/809–815; 312/280, 281–284, 286, 430, 439, 443–449

[56] References Cited

U.S. PATENT DOCUMENTS

| | | | |
|---|---|---|---|
| 4,449,079 | 5/1984 | Erdman | 318/254 X |
| 4,540,921 | 8/1985 | Boyd, Jr. et al. | 318/254 X |
| 4,636,936 | 1/1987 | Boyd, Jr. et al. | 318/254 X |
| 4,642,536 | 2/1987 | Boyd, Jr. et al. | 318/254 X |
| 4,642,537 | 2/1987 | Young | 318/254 X |
| 4,654,566 | 3/1987 | Erdman | 318/254 X |
| 4,857,814 | 8/1989 | Duncan | 318/138 X |

Primary Examiner—William M. Shoop, Jr.
Assistant Examiner—David Martin
Attorney, Agent, or Firm—Trexler, Bushnell, Giangiorgi & Blackstone, Ltd.

[57] ABSTRACT

A method of cyclically accelerating an electric motor for example for use during an agitation cycle in a laundry machine. A desired speed, direction of rotation and acceleration time is set and power is applied to the motor in a series of incremental steps, each successive step corresponding to an increase in the level of power applied during the previous step. The steps are initially estimated to be sufficient to enable sufficient energy to be supplied to the motor for it to reach the desired speed in the acceleration time. The speed of the motor is monitored and the steps of accelerating the motor are repeated with the series of incremental steps adjusted to adjust the supply of energy to the motor dependant on the speed reached in the acceleration time of the previous cycle.

13 Claims, 3 Drawing Sheets

ELECTRONIC CONTROLS FOR ELECTRIC MOTORS, LAUNDRY MACHINES INCLUDING SUCH CONTROLS AND MOTORS AND/OR METHODS OF OPERATING SAID CONTROLS

This invention relates to electronic controls for electric motors, laundry machines including such controls and motors and/or methods of operating said controls.

It is an object of the present invention to provide an electronic motor control for controlling electric motors and/or a laundry machines including such controls motors and/or a method of operating laundry machines using such controls which will at least provide the public with a useful choice.

Accordingly in one aspect the invention consists in a method of electronically cyclically controlling the supply of power to an electric motor having a rotor and a stator using control means to control the supply of power to said motor, said method including the steps of performing cycles of accelerating said rotor to a plateau speed and bringing said rotor to rest by
a. in each cycle setting a desired speed and direction of rotation and a desired acceleration time for the motor from rest to said desired speed;
b. Setting an initial series of incremental steps, each successive step corresponding to an increase in the level of power supplied to said motor over the level of power supply reached in the previous step, said steps being initially estimated to be sufficient to enable sufficient energy to be supplied to said motor to reach said desired speed in said acceleration time;
c. Supplying power to said motor in said incremental steps and determining the speed attained after said acceleration time has elapsed which speed depends on the resistance to rotation of said motor;
d. Switching off the power supply to said motor and allowing said motor to come to rest;
e. repeating steps (b) to (d) as desired in the same or a reverse direction with the energy supplied adjusted by adjusting the number and/or size of said incremental steps.

In a further aspect the invention consists in a method of controlling a laundry machine having a washing container, a spin tub and agitator within said container, said agitator being connected so as to be rotated back and forth by an electric motor and to be rotated with said spin tub when driven continuously in one direction, the supply of power to said motor being cyclically controlled as described in the preceding paragraph.

In a still further aspect the invention consists in an electronic control means for cyclically controlling the supply of power to an electric motor having a rotor and a stator to perform cycles of accelerating said rotor to a plateau speed and bringing said motor to rest, said control means including
a. power supply means provided to supply power to said motor at a desired rate;
b. speed setting means operable to set a desired speed of rotation of said rotor and a desired acceleration time for said motor from rest to said desired speed;
c. incremental step setting means to set an initial series of incremental steps, each successive step corresponding to an increase in the level of power supplied to said motor over the level of power supply reached in the previous step, said steps being estimated to be sufficient to enable sufficient energy to be supplied to said motor to reach said desired speed in said acceleration time;
d. speed determining means to determine the speed of said motor;
e. switching means to switch off the power supply to said motor;
f. adjusting means responsive to control signals from said speed determining means to adjust the number and/or size of said incremental steps to adjust the supply of energy to said motor to adjust the acceleration and thereby change said motor speed towards said desired speed during a next cycle of operations.

In a still further aspect the invention consists in a laundry machine having a laundry machine having a washing container, a spin tub and agitator within said container, said agitator being connected so as to be rotated back and forth by an electric motor and to be rotated with said spin tub when driven continuously in one direction, said machine including an electronic control means as described in the preceding paragraph.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

One preferred form of the invention will now be described with reference to the accompanying drawings.

Figure 1:
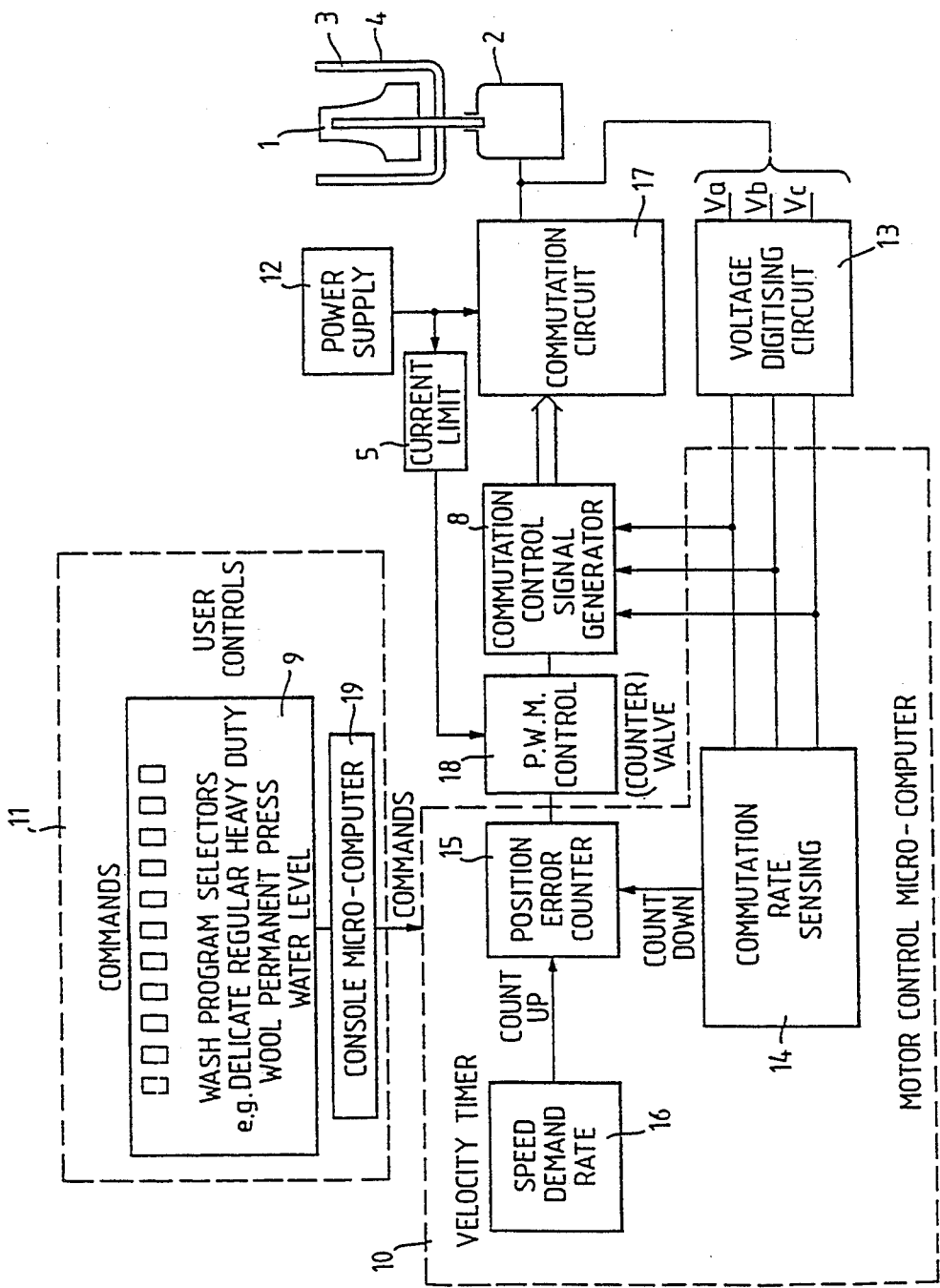
FIG. 1 is a block diagram of an electronic control circuit to control an electronically commutated motor driving an agitator and spin tub of a clothes washing machine which block diagram is modified according to the present invention.

This invention is a development of the invention disclosed in our New Zealand Patent Specification No. 213489/90 (U.S. Pat. No. 4,857,814) and the FIG. 1 of the accompanying drawings is taken from that specification.

The following extract from the description thereof in the above specifications gives a background to the present invention:

"This invention relates in general to a laundry machine with a cabinet a wash water container in its cabinet, a spin tub in the container reciprocating agitator in the spin tub and a motor for driving the agitator in the spin tub. Specifically it relates to sensing means for sensing the load on the agitator and adjusting means operating in response to signals from the sensing means to adjust the power by adjustment of the profile of velocity to the agitator as indicated by a velocity/time graph such that soil removal and washing activity remain substantially constant according to a desired setting for different loads.

Laundry machines are required to wash a wide variety of fabrics and garments. Different clothes and fabric types require different treatment to achieve an appropriate wash action. In general, with vertical agitator washing machines, as agitator velocity is increased, soil removal and wear and tear also increase. An appropriate balance between soil removal and wear and tear is necessary. It is a major objective of laundry machines to wash each type of fabric with an agitator action appropriate to the load type and size. For example, clothes which fall into the broad category of "delicates", often synthetic in origin, or fragile items which are susceptible to damage during the wash but which are typically only slightly soiled, require gentleness of wash action with less emphasis on soil removal, whereas "regular" items such as cottons which are strong when wet can withstand a more vigorous wash action.

Conventional vertical axis laundry machines employ various types of transmissions to convert rotary motion provided by an electric motor into oscillatory motion at the agitator for their wash mode. Such motors are generally of essentially constant speed types. Therefore to provide wash actions suitable for loads ranging from delicate garments to heavily soiled hard wearing garments requires multiple gearing or switched speed motors each of which is costly. Further, as wash load is increased towards rated capacity for a constant amount of water, mean soil removal typically decreases and mean gentleness increases. Variance of soil removal and gentleness also increases, indicating less uniformity of wash action throughout the wash load. Therefore it is difficult to maintain good wash performance with laundry machines of this type under varying load conditions.

The use of agitator drive systems such as disclosed in the John Henry Boyd Australian Patent Specification AU-A-85-183/82 and United Kingdom Patent UKN2095705 wherein the agitator may be directly driven by an electronically controlled motor either with or without a simple speed reduction unit and oscillatory rotation is enabled by periodic reversal of rotation of the motor provides opportunity for varying the speed and rate of reversal of the agitator to obtain the appropriate balance between soil removal and wear and tear for each category of load. However the problem of variation of soil removal and also wear and tear with load size still remains.

The following describes an apparatus to carry out an oscillatory rotation of the agitator during a washing phase of the cycle of operations of the washing machine and then on command to spin the spin tub in a spin phase of the washing cycle, and is principally concerned with the agitation cycle.

Later in this specification a detailed description is given of preferred forms of sensing means to sense the wash load in the laundry machine, correcting means to correct for velocity variations, adjusting means to adjust the power applied to the agitator by modification of the profile of velocity as indicated by a velocity/time graph, and setting means to alter the stroke angle of the agitator such that soil removal and wear and tear such that wash performance remain substantially constant for a particular setting with variation of load size.

The preferred form of the invention is based on the Boyd and Muller U.S. Pat. No. 4,540,921.

Referring to FIG. 1 of the drawings, an electronically commutated motor (ECM) 2 is described in detail in the Boyd/Muller U.S. Pat. No. 4,540,921. The ECM 2 is connected to the agitator 1 of a laundry machine having a washing container 4 and a spin tub within the container. The agitator is connected to the motor and spin tub so as to be rotated back and forth by the motor to provide an agitating action and is on demand, connected so as to be rotated with said spin tub when driven continuously in one direction, e.g. during a spin cycle. A suitable system is described in U.S. Pat. No. 4,813,248. The ECM 2 constitutes a stationary assembly comprising a stator having a plurality of winding stages adapted to be selectively commutated, and rotatable means associated with that stationary assembly in selective magnetic coupling relation with the winding stages. The winding stages are commutated without brushes by sensing the rotational position of the rotor as it rotates within the stationary assembly. DC voltage is selectively applied by commutation circuit 17 to the winding stages in preselected orders of sequences leaving at least one of the winding stages unpowered at any one time while the other winding stages are powered in response to a pattern of control signals from voltage digitizing circuit 13.

The control apparatus comprises a general purpose microcomputer 10 e.g. a National COP800 which receives commands for example from a console 11 having a series of push buttons or other user operable controls 9 and the microcomputer 10 stores patterns of signals which feed through a Pulse width modulation control means 18 and a commutation control signal generator 8 (which are described in more detail later) to a three phase power bridge switching circuit 17. The necessary power supplies are fed by a DC Power supply 12. In order to detect the position of the rotor relative to the stator preferably signals are fed from a winding of the ECM which is unpowered when other windings in the stator of the ECM are under power. This will be explained further later. Signals from the motor windings are fed to a voltage digitising circuit 13, as described in the Boyd Muller Specification, and are thence supplied to the microcomputer 10. Alternatively Hall effect sensors positioned adjacent to stator windings may be used to provide signals indicative of rotor position. Power switching circuits also feed through a current sensing circuit 5 to the microcomputer 10. A loop position error indicator 15 and a speed demand rate velocity timer 16 are provided and a commutation rate sensing device 14 but any other rotor speed and position varying device may be used. A pulse width modulation control circuit 18 is provided.

In broad terms a clothes washing machine according to the present invention when operated to cause washing, by causing the agitator 1 to rotate in a forward and then a reverse direction by suitably commutating the motor 2 functions as follows.

The operator selects a desired set of washing requirements by operating operating push buttons controlling its console microcomputer. As a result the console microcomputer sends a series of data values to the motor control microcomputer 10 and these are placed into registers (memory locations) of the same name, in the motor control microcomputer 10. Data transmitted from the console is broken up into 3 groups:

Group 1 contains the command words:
    00H-BRAKE
    01H-WASH
    02H-SPIN
    03H-TEST
    04H-MODIFY
    05H-STOP
    06H-STOP
    07H-PUMP Group 2 contains error codes:

08H-PARAMETER range error detected
09H-PARITY error detected
0AH-COMMAND error detected
Group 3 contains parameter data:
0BH to 7FH The motor control microcomputer program knows which group to expect during each communication, therefore in the program has got out of step with the console in any way this will be picked up as a range error.

However due to this data structure some data in group 3 may be outside their working range so within the listing some parameters are offset after they have been received so that they fall within the correct value to be used within the program.

To maintain function overviews, at the beginning of the wash cycle the console microcomputer 19 controls the filling of the bowl. While the bowl is filling a spin command is sent to the motor control microcomputer. The spin speed is very low, approximately 70 rpm, and its main purpose is to mix the soap powder while the bowl is being filled. Once the bowl is filled the console then sends a WASH command to the motor controller 10 to start the agitate cycle. This agitate cycle starts from rest, ramps up to speed, maintains this speed for a predetermined time and then coats to a stop all within one forward or reverse cycle of the agitator. Once the agitator has stopped the process is repeated in the opposite direction thus producing an agitating motion. The console microcomputer 19 determines all these parameters which determine what sort of wash is required e.g. gentle cycle, and is loaded into the motor controller 10 before the start of the cycle.

The motor controller 10 continually modifies these wash parameters to account for the load in order to maintain the most effective dirt removal to gentleness ratio. Because of the agitating motion the load is shuffled around the bowl and this affects how fast the agitator ramps to speed and how long it takes to come to a stop at the end of the stroke. Therefore to maintain constant wash effectiveness these parameters are monitored and modified each stroke cycle to at least attempt to maintain the ideal conditions requested by the console microcomputer.

The motor controller 10 will continue this action until it receives another command from the console microcomputer. In a little more detail, the wash mode runs as follows.

On receiving a "WASH" command a jump is made to the WASH routine. Low speed windings of the motor are set and a brake is set off. The routine then waits for the Console microcomputer to end the wash cycle parameters, i.e.:

(1) The time for rotation of the agitator in one direction.
(2) WRAMP The time is takes to reach speed from rest.
(3) ENDSPD The velocity which the agitator must reach after the wash ramp time is up.

When these have been placed in the appropriate registers they are then checked for errors. Checks for other errors are also made including a check to make sure the motor is stationary.

A routine now sets LORATE=ENDSPD=ACCSPD. LORATE is the motor speed, ACCSPD is the speed that the motor must reach to obtain the correct wash ramp rate. ACCSPD may become greater than ENDSPD to achieve the correct acceleration ramp.

The speed rate timer RATETMR used in the timer interrupt routine for the speed reference count is loaded with the count set in LORATE previously.

The position error counter 15 is cleared and current trip and pattern error circuits are reset. In the wash mode the program by passes the spin cycle routine.

At this point the plateau time, TFLAT, is calculated from the original information sent by the Console microcomputer. To do this it sets the coast time at 180 ms. This is the time chosen which guarantees that the motor will have coasted to a stop with very little load. Thus the plateau time is calculated:

TFLAT=TSTOKE-WRAMP-15 (180 ms time count) using a longer timer a count of 15 gives:
$127 \times 96$ $\mu$s$\times 15 = 180$ ms (approx).

The routines up this point have only been setting the wash parameters for the first stroke. The following values as referred to above, are set in the random access memory in the motor control microcomputer 10:

| | |
|---|---|
| TSTROKE | total stroke time, i.e. from rest to peak speed and to rest again. |
| WRAMP | time to full speed |
| ENDSPD | full speed count |
| LORATE | (set at ENDSPD) speed rate |
| ACCSPD | (set at ENDSPD) acceleration rate |
| ALGFLG | (set FALSE) end of ramp flag |
| ENDFLG | (set FALSE) plateau time flag |
| SLECTR | position error counter |
| RATETMR | (set at LORATE) sets speed reference to speed loop error counter |
| TFLAT | calculated from above parameters; time at maximum speed |

At this point the wash cycle can begin.

According to the present invention the above apparatus and method are modified as will now be described. Power is supplied to the motor using pulse width means comprising part of the motor control means e.g. a microprocessor. A pulse width modulation period is provided during which power is supplied to the motor for a predetermined "on" time and power is removed from the motor during a predetermined "off" time, the "on" time and the "off" time together making up the modulation period. The duty cycle or PWM rate is increased by increasing the duration of the "on" time relative to the "off" time in each modulation period.

Figure 2:
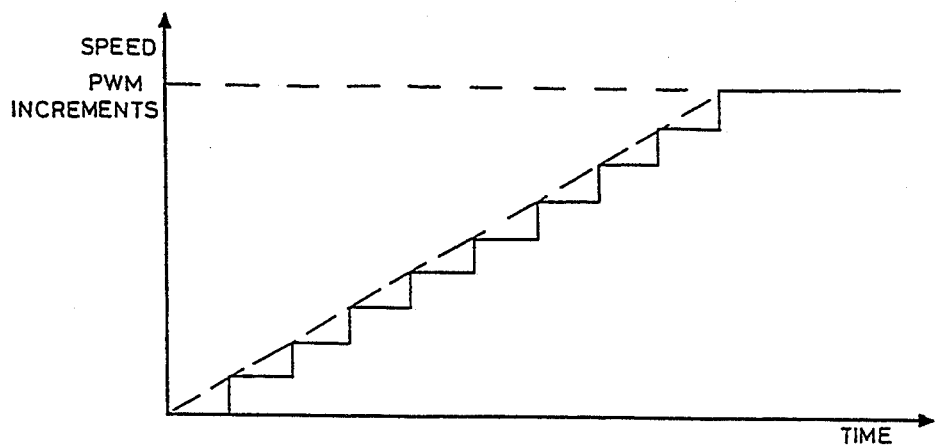
FIG. 2 is a graph showing speed against time with the PWM increments shown outlined in diagrammatic form.

According to the present invention, in carrying out a washing sequence and referring to FIG. 2, the acceleration rate is controlled by controlling the increase of PWM rate and hence the torque of the motor. In FIG. 2 the acceleration is shown diagrammatically as increasing in discrete steps 20, each step corresponding to an increase in PWM rate. At the end of the ramp period the speed is checked and the PWM rate of increase is adjusted up or down, depending on whether the speed is too low or too high.

The acceleration rate of the present invention can be defined in relation to a fixed time interval and is independent of final speed not like the acceleration rate of our earlier aforementioned New Zealand Patent Specification No. 213489/90. In other words regardless of how fast you want the machine to agitate it is possible to have any ramp rate period from e.g. 80 ms–400 ms. This adds an extra variable to control the wash performance and also a control on how the wash profile looks to the end user, e.g. very long ramps make the wash stroke look slow and soft.

Figure 3:
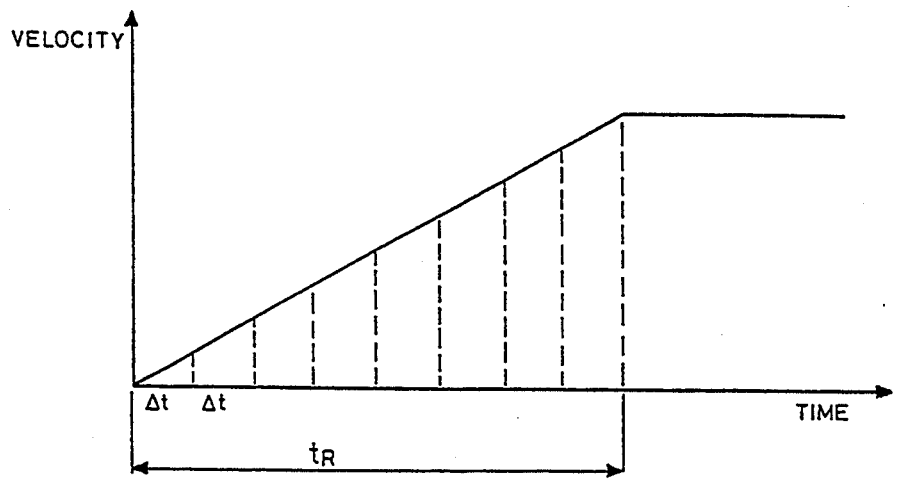
FIG. 3 is a velocity against time graph.

Referring to FIG. 3, PWM is incremented every Δt in a series of incremental steps. Therefore the smaller Δt is the more the PWM is incremented and thus the more power is supplied to the motor.

Δt is determined by defining the ramp time $t_R$ and the number of PWM rate increments (called steps).

$$\therefore \Delta t = \frac{t_R}{STEPS}$$

e.g. $t_R = 100$ ms, STEPS $= 16 \rightarrow \Delta t = \frac{100 \text{ ms}}{16} = 6.25$ ms $t_R = 400$ ms, STEPS $= 16 \rightarrow \Delta t = \frac{400 \text{ ms}}{16} = 25$ ms So in order to have the same number of incremental steps from one ramp time, $t_R$, to another, the time between successive steps must vary depending on $t_R$. In this manner we are able to control the motion of the motor so that it will reach speed in time $t_R$.

To further complicate matters, the load on the motor will not be constant due to the wash load, so therefore it is not a simple matter to predetermine the number of incremental steps in order to obtain the correct speed within time $t_R$.

For example, if the load in the machine is very light then not a great deal of power in the motor is needed to accelerate it to speed in time $t_R$, but with a heavy load a lot more power is needed. The amount of power than can be supplied to accelerate to speed in time $t_R$ is proportional to the rate of increase of the incremental steps.

For example a light load may only require say 6 incremental steps to accelerate the motor to a desired speed in a desired acceleration time e.g. 100 ms whereas a heavy load may require say 62 steps (i.e. almost full PWM, the maximum PWM steps being 64) to reach the same speed in 100 ms. The motor speed is monitored by speed determining means comprising part of the motor control means.

In order to achieve this the software must monitor the performance of each ramp cycle and adjust the PWM rates using incremental step setting means for the next stroke.

The software parameters are calculated in the following manner:

As stated the maximum number of PWM steps is 64.

The microprocessor timer base is 162 μs.

If 64 steps are not required then we must add multiples of above timer counts.

e.g. ramp of 100 ms.

If we have a ramp of 100 ms $$\rightarrow \text{each step} = \frac{100 \text{ ms}}{64} = 1.56 \text{ ms}$$

$$\therefore RAMP = \frac{1.56 \text{ ms}}{162 \text{ μs}} = 10 \text{ microprocessor timer intervals}$$

If we have a ramp of 400 ms $$\rightarrow \text{each step} = \frac{400 \text{ ms}}{64} = 6.25 \text{ ms}$$

$$\therefore RAMP = \frac{6.25 \text{ mS}}{162 \text{ μs}} = 39 \text{ microprocessor timer intervals}$$

If 64 steps are not required then we must add multiples of above timer counts.

e.g. ramp of 100 ms

If we want 16 steps instead of 64 then $$\text{each step} = \frac{100 \text{ ms}}{16} = 6.25 \text{ ms}$$

$$\therefore \frac{6.25 \text{ ms}}{1.56 \text{ ms}} = 4 \therefore \text{ we must count 4 lots of RAMP}$$

ramp of 400 ms

If we want 16 steps instead of 64 then each step $= 25$ ms $$\therefore \frac{25 \text{ ms}}{6.25 \text{ ms}} = 4 \therefore \text{ we must count 4 lots of RAMP}$$

Notice that for a ramp of 100 ms or 400 ms this multiplying factor remains the same and simply defines the number of steps in the ramp. The count labelled RAMP varies with ramp time, so that is the variable that defines total ramp time.

∴ we have $$RAMP = \frac{(RAMP\ TIME)}{(TOTAL\ COUNTS)} / TIME\ BASE \quad \text{equation (1)}$$

$$COUNTS = \frac{(RAMP\ TIME)}{(STEPS)} / \frac{(RAMP\ TIME)}{(TOTAL\ COUNTS)} \quad \text{equation (2)}$$

$$= \frac{(TOTAL\ COUNTS)}{(STEPS)}$$

i.e. Ratio of max steps to required steps.

The two variables RAMP and COUNT above are two registers which make up a timer in the microprocessor code with a base time of 162 μs. The count store in RAMP is decremented every 162 μs and upon reaching zero count the value in COUNTS is decremented. RAMP is reloaded every time it reaches zero.

e.g. if RAMP $= 10$ then COUNTS is decremented every $10 \times 162$ μs $= 1.62$ ms.

Once COUNTS reaches zero the PWM is incremented in a further incremental step and the process is repeated until total ramp time is up.

Total ramp time is determined by adding the value in COUNTS every PWM step. Since COUNTS is a ratio of the number of required PWM steps to total PWM steps then when the sum of COUNTS after each step is equal to total PWM steps we have reached total ramp time.

i.e. $COUNTS + COUNTS_2 + COUNTS_3 + \ldots +$ $COUNTS_{STEPS} = $ TOTAL COUNT $\Sigma(COUNTS) = $ TOTAL COUNT e.g. RAMP TIME $= 100$ ms
STEPS $= 16$, TOTAL COUNTS $= 64$ $$\therefore COUNTS = \frac{64}{16} = 4$$

$$\therefore RAMP = \frac{(100 \text{ mS})}{64} \times \frac{1}{162} = 10$$

This means that every $10 \times $(TIME BASE)$ = 10 \times 162$ μs COUNTS will be decremented.

When COUNTS $= 0$ then the *PWM* will be increased by one count.

-continued $$\therefore PWM \text{ increase every } (10 \times 162 \text{ } \mu s) \times 4 = 6.48 \text{ ms}$$

$$\therefore \text{Total ramp time is (STEPS} \times 6.48 \text{ ms)} =$$

$$16 \times 6.48 \text{ ms} = 104 \text{ ms}$$

Software measures ramp time as
$$\text{COUNTS} + \text{COUNTS2} + \ldots + \text{COUNTS}_{STEPS}$$
$$4 + 4_2 + 4_3 + \ldots + 4_{16} = 64$$

When the sum of all the COUNTS reaches total count then that is the end of RAMP.

Because it is not known what load will be put into the machine at any one time, the software must adjust the RAMP variables to achieve the desired ramp acceleration. Also, the maximum number of PWM steps (TOTAL COUNTS) may be varied to achieve the desired ramp acceleration so that the rate of PWM increased is increased in successive incremental steps.

The number of steps are initially preset to a minimum using setting means so that no adjustment is needed for very light loads.

The speed at the end of the ramp period is monitored and if it is found to be under speed then the register COUNTS is decremented. This effectively increases the number of PWM steps, and hence the power to the motor, within the ramp time period.

It can be seen from equation (2) that by decreasing COUNTS by 1 does not correspondingly increase the number of steps by 1, i.e. the relationship is not linear.

Also it can be seen from equation (2) that the PWM step resolution can be changed by altering the ratio.

$$\frac{\text{TOTAL COUNTS}}{\text{STEPS}}$$

i.e. Increasing TOTAL COUNTS will increase the resolution in PWM steps.

However by increasing the STEP resolution we actually decrease the RAMP TIME resolution.

It was found that the best compromise was the following

RAMP TIME INCREMENTS = 20 ms
TOTAL COUNTS = 123
STEPS = 5-62
Σ COUNTS >120

$$\overset{\text{equation}}{(1)} \rightarrow \text{RAMP} = \frac{\text{RAMP TIME}}{123 \times 162 \text{ }\mu S} = \frac{\text{RAMP TIME}}{20 \text{ ms}}$$

$$\overset{\text{equation}}{(2)} \rightarrow \text{COUNTS} = \frac{123}{\text{STEPS}}$$

Figure 4:
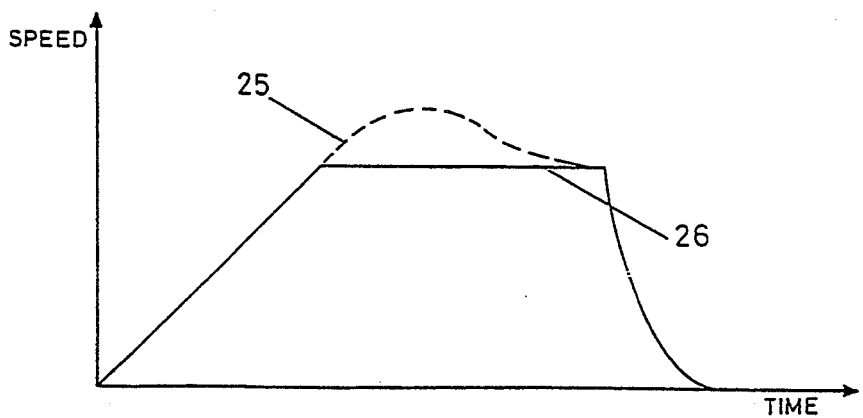
FIGS. 4 to 8 are speed against time graphs showing features of the invention in preferred forms of the invention.
Figure 5:
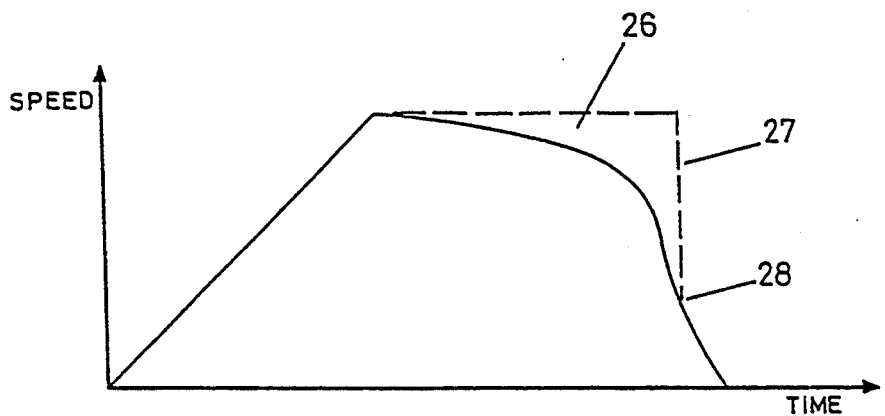

At least in the preferred form the invention also envisages control of the plateau region and of overshoot, illustrated at 25 in FIG. 4 either in combination with or separate from the above acceleration control. Ideally, k in the plateau region 26, a plateau speed is maintained for a plateau time period. Thus need for overshoot control in the plateau region 26 of the wash performance profile is particularly relevant at heavy loads. At extremely heavy loads the wash profile cannot be maintained due to torque constraints on the motor. The region that cannot be maintained is the plateau region 26 of the ideal profile 27 (FIG. 5). With very heavy loads the actual profile 28 has an area under it which is greatly reduced and hence the overall wash performance is also reduced.

Since this is a torque limited process we must use software techniques to improve the area under the graph.

Under most conditions the load on the agitator is not normally its heaviest until approximately half way through the plateau region. As the load in the bowl is increased the tail end of the Plateau region begins to deteriorate until with extreme loads about ¾ of the Plateau region is under speed.

Figure 6:
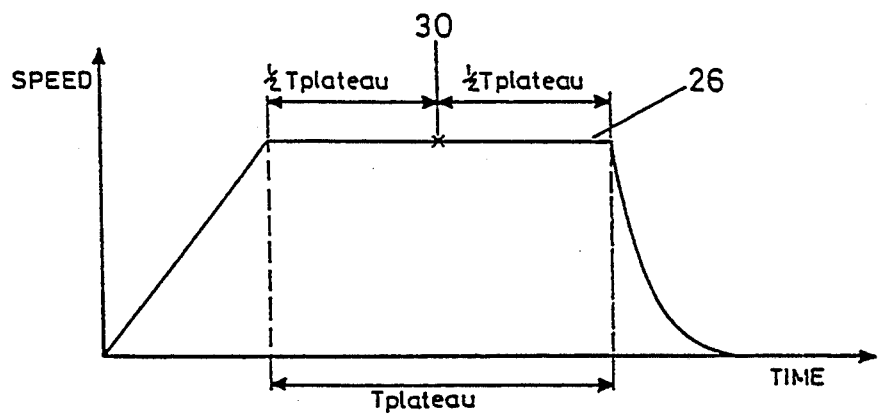

To overcome this problem by the present invention the software is modified to monitor the plateau region speed and if underspeed, adds in a degree of initial overshoot. Through experimentation it has been found that the best point to measure the speed and determine when to add or subtract compensation is at the mid point 30 of the plateau region as is illustrated in FIG. 6.

By moving this measuring point backwards or forwards in time varying degrees of overshoot compensation can be used. By moving the point forward, i.e. later in time, compensation can be added with lighter loads than if the point is moved backwards i.e. earlier in time.

Figure 7:
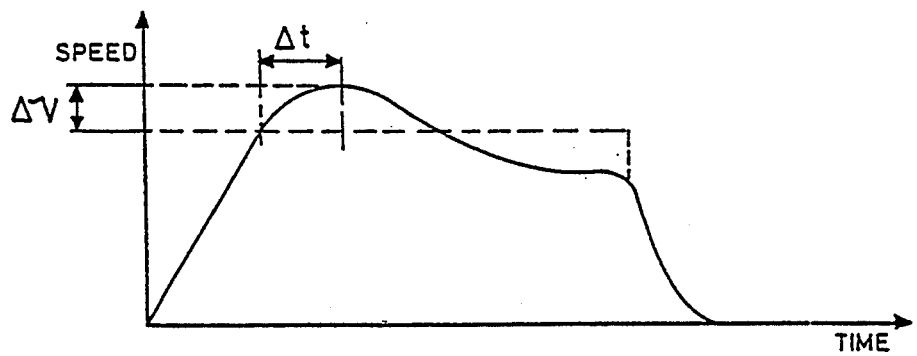
Figure 8:
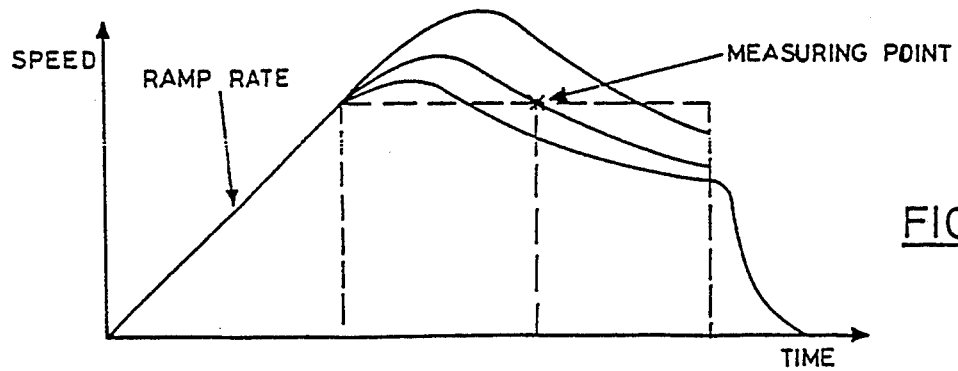

If the measuring point indicates a speed that is under the desired speed then on the next stroke cycle at the end of the ramp period the software will increase the plateau speed Δ for a predetermined time, Δt, as seen in FIG. 7. As the load increases, the compensation must also increase. The first parameter that is increased is the overshoot time, Δt. This is increased until either the measuring point is at speed or, Δt=plateau time. (Δ has an initial set value which is not zero).

If Δt=plateau time and the measuring point is still under speed i.e. load is very heavy, then the overshoot speed Δ is increased until a preset limit is reached or the measuring point is at speed.

If however the load is so great (i.e. 7 kg in a larger model laundry machine) that when maximum overshoot compensation has been reached and the measuring point still indicates an underspeed then the ramp rate is also increased as described above in relation to acceleration ramp control.

This overshoot compensation is being constantly monitored and reduction can be effected e.g. if for some reason the clothes were initially bunched up around the agitator giving the appearance of a heavy load but were slowly freed due to the agitate action.

Compensation is preferably programmed to be added or reduced slowly so that the system does not oscillate and give erratic results.

At the end of the constant speed plateau region the power to the motor is turned off and allowed to coast before power is applied to reverse the direction of rotation of the rotor of the motor 2 and hence the agitator 1 using reversing means. The software monitors this coast period and a normal coast to zero speed time is 180 ms. If the time is greater than approximately 300 ms the software assumes that there is either too much load in the bowl for which a reasonable wash action is not possible or that the spin tub has for some reason re-engaged its clutch mechanism in which case further agitation will result in damage to the mechanical system.

The software will, on the receipt of a long coast period in both directions consecutively, signal an overload error to the user. When the water container is emptied to water as a preparatory step to spinning, a check is made on the load to see if the clutch between the agitator and the spin tube has engaged so that spinning of both agitator and spin tub can commence. Similarly, the spin tub and agitator are tested for disengagement before agitation commences. Disengagement of the clutch when filling with water is already disclosed in our earlier patent specification No. 230489.

The method of testing for engagement between the agitator and spin tub before spin and agitation cycles is the same as that disclosed in our abovementioned earlier specification. In use a small amount of energy is applied to the electric motor using control circuitry which causes the rotor to rotate and accelerate to a predetermined rotational velocity. When this predetermined rotational velocity is attained, power is removed from the motor by the control circuitry and the rotor of the motor and the rotatable assembly comprising the agitator and spin tub (if connected to the agitator) are allowed to coast. The time taken for the rotor and rotatable assembly to come to a halt is a measure of the inertia of the rotatable assembly. If the time taken for the rotatable assembly to stop rotating is greater than a predetermined maximum time, then the inertia of the rotatable assembly is known to be over a maximum value and the control circuitry will sense that the spin tub must be connected to the agitator. Alternatively if the time taken for the rotatable assembly to stop rotating is less than the predetermined maximum time then the control circuitry will sense that the spin tub is not connected to the agitator since the overall mass (and therefore the inertia) of the rotatable assembly is significantly reduced. This test is performed before agitation cycles to ensure that the spin tub and agitator are disengaged and before spin cycles to ensure that interengagement has been effected.

It will be seen that at least in the preferred form of the invention control of acceleration and/or plateau level speed is effected surely and effectively to give better washing action in the loading machine under widely varying load demands.

What is claimed is:

1. A method of electronically cyclically controlling the supply of power to an electric motor having a rotor and a stator using control means to control the supply of power to said motor, said method including the steps of performing cycles of accelerating said rotor to a plateau speed and bringing said rotor to rest by
   a. in each cycle setting a desired speed and direction of rotation and a desired acceleration time for the motor from rest to said desired speed;
   b. setting an initial series of incremental steps, each successive step corresponding to an increase in the level of power supplied to said motor over the level of power supply reached in the previous step, said steps being initially estimated to be sufficient to enable sufficient energy to be supplied to said motor to reach said desired speed in said acceleration time;
   c. supplying power to said motor in said incremental steps and determining the speed attained after said acceleration time has elapsed, the speed being determined by rotational inertia of said rotor and any load connected thereto;
   d. switching off the power supply to said motor and allowing said motor to come to rest;
   e. repeating steps (b) to (d) as desired in the same or a reverse direction with the energy supplied adjusted by adjusting the number and/or size of said incremental steps.

2. A method as claimed in claim 1 where in step (e) the direction of rotation of said motor alternates between succeeding cycles of forward and reverse directions.

3. A method as claimed in claim 1 which includes during each cycle, the steps of (f) maintaining the supply of power for a further period of time being a plateau time and testing the plateau speed of said motor during said plateau time (g); adjusting the power supplied during said plateau time so that the speed of said motor is maintained as close as possible to said desired speed within the torque limits of the motor.

4. A method as claimed in claim 1 which includes the steps of increasing the level of power applied to said motor in each said incremental step if said desired speed is not reached when the acceleration time of the previous cycle elapses and decreasing the level of power applied in each said incremental step if the speed of said motor is greater than said desired speed when the acceleration time of the previous cycle elapses.

5. A method as claimed in claim 1 which includes the steps of increasing the number of incremental steps in said acceleration time if said desired speed is not reached when the acceleration time of the previous cycle elapses and decreasing the number of incremental steps if the speed of said motor is greater than said desired speed when the acceleration time of the previous cycle elapses.

6. A method as claimed in claim 1 which includes the step of supplying power to said motor using pulse width modulation (PWM) means for supplying power to said motor in discrete pulses and supplying said pulses at a desired PWM rate and increasing the PWM rate in successive incremental steps to increase the power supplied to said motor.

7. A method as claimed in claim 1 wherein motor forms part of a laundry machine having a washing container, a spin tub and agitator within said container, said agitator being connected so as to be rotated back and forth by an electric motor and to be rotated with said spin tub when driven continuously in one direction.

8. A method as claimed in claim 1 or claim 2 which includes the step of monitoring the speed of said motor during a plateau time being the time after said acceleration time has elapsed and before the time said power supply is removed from said motor.

9. A method as claimed in claim 8 which includes the step of monitoring the speed of said motor at a time approximately mid-way through said plateau time.

10. A method as claimed in claim 8 which includes the step of increasing said desired speed if the speed of said motor during said plateau time of the previous cycle is less than the desired speed in the previous cycle.

11. A method as claimed in claim 8 which includes the steps of increasing said acceleration time if the speed of said motor during said plateau time of the previous cycle is less than the desired speed in the previous cycle.

12. A method as claimed in claim 11 which includes the steps of increasing the number of said incremental steps in said acceleration time if said desired speed is not reached before the acceleration of the previous cycle elapses, and decreasing the number of said incremental steps if the speed of motor is greater than said desired speed when the acceleration time of the previous cycle elapses.

13. A method as claimed in claim 8 which includes the steps of increasing the number of said incremental steps to supply more power to the motor during said acceleration time if the speed of said motor during said plateau time of the previous cycle is less than said desired speed in the previous cycle.

* * * * *

UNITED STATES PATENT AND TRADEMARK OFFICE
CERTIFICATE OF CORRECTION

PATENT NO. : 5,341,452
DATED : August 23, 1994
INVENTOR(S) : David J. Ensor

It is certified that error appears in the above-indentified patent and that said Letters Patent is hereby corrected as shown below:

Column 5, Line 8 "in" should read —if —

Column 5, Line 55 "(1) The time" should read — (1) TSTROKE The time —

Column 5, Line 56 "is" should read —it—

Column 7, Line 29 "than" should read —that—

Column 8, Line 23 "equation (1)" should read — - equation (1) —

Column 8, Line 26 "equation (2)" should read — - equation (2) —

Column 11, Line 1 "tube" should read — tub —

Signed and Sealed this

Twenty-ninth Day of November, 1994

Attest:

BRUCE LEHMAN

*Attesting Officer*   *Commissioner of Patents and Trademarks*